United States Patent Office 3,845,018
Patented Oct. 29, 1974

3,845,018
ACETYLENE SUBSTITUTED POLYAMIDE OLIGOMERS
Norman Bilow, Los Angeles, Abraham L. Landis, Northridge, and Leroy J. Miller, Canoga Park, Calif., assignors to Hughes Aircraft Company, Culver City, Calif.
No Drawing. Continuation-in-part of abandoned application Ser. No. 347,501, Apr. 3, 1973. This application Nov. 6, 1973, Ser. No. 413,473
Int. Cl. C08g 20/32
U.S. Cl. 260—47 CP    23 Claims

ABSTRACT OF THE DISCLOSURE

The present invention is directed to a novel class of acetylene-substituted (ethynyl-substituted) polyimide oligomers and the polyamic acid or ester precursors thereof. The acetylene groups on the oligomers allow the compounds to be cured through addition reactions which result in little or no outgassing. In addition, these oligomers are self-curing with heat. The fully cured polyimides derived from these oligomers have excellent thermal and mechanical properties at high temperatures.

The invention herein described was made in the course of or under a contract with the United States Air Force.

RELATED APPLICATION

This application is a continuation-in-part of application Ser. No. 347,501 filed Apr. 3, 1973 and now abandoned. A novel process for making compounds of Formula VII below, used as intermediates in the invention, is disclosed in application Ser. No. 347,502, also filed on Apr. 3, 1973.

BACKGROUND OF THE INVENTION

The patent literature has fully disclose the preparation of polyimide oligomers and precursors by reaction of aromatic compounds, such as pyromellitic acid and 3,3',4,4'-benzophenonetetracarboxylic acid, lower alkyl esters thereof, or the corresponding dianhydrides, with aromatic diamines. The fully cured polyimide compounds are relatively insoluble and intractable materials. When they are used as laminating resins, adhesives, etc., they are applied in the form of the polyamic acid or ester precursor and then cured. This cure step produces water or alcohol as byproduct, resulting in the formation of undesirable voids in the final composite assembly.

SUMMARY OF THE PRESENT INVENTION

Our invention is directed to a class of polyimides and precursors thereof. The polyimide precursors may be applied as coatings on wires or other substrates, as adhesives, or as laminating resins. In addition, they may be used to form addition copolymers with compounds such as terephthalonitrile N,N'-dioxide. In either event, the final products, e.g., coatings cured adhesives, laminates, etc., have very low void content as well as excellent thermal and physical properties.

DETAILED DESCRIPTION OF THE INVENTION

The novel polyimide compounds of this invention have the general formula

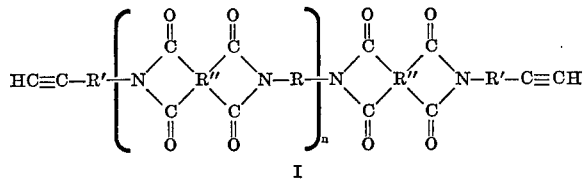

I wherein $n$ is an average value from 1 to about 10, preferably from 1 to about 4, when in prepolymeric or uncured form, R is poly(arylene ether), diarylene ketone, diarylene methane, diarylene sulfone, or poly(arylene thioether) or the acetylene substituted derivatives thereof, R' is arylene, diarylene thioether, diarylene methane, or diarylene ether, R" is

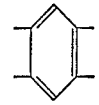

II

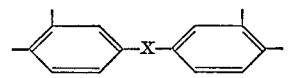

III and X is C=O, $CH_2$, O, S, or a bond, or acetylene substituted derivatives thereof.

Our invention also includes polyimide precursors of the formula

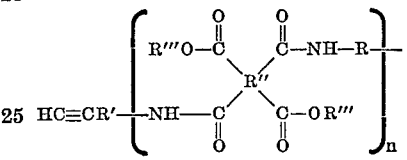

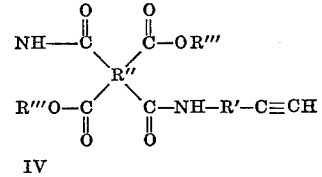

IV wherein R, R', R" and $n$ are defined above, and R''' is H or lower alkyl, such as methyl, propyl, butyl and preferably ethyl. R" and R may also contain pendent ethynyl groups.

The precursors of Formula IV can be prepared in accordance with the processes of the prior art by reacting a stoichiometric excess of an aromatic tetracarboxylic acid, a lower alkyl tetra ester thereof, or the corresponding dianhydride with a compound of the formula $$H_2N-R-NH_2,$$

wherein R is poly(arylene ether, diarylene ketone, diarylene methane, diarylene sulfone, poly(arylene thioether) or an acetylene-substituted derivative thereof. In order to increase the tractability and solubility of the acetylene-substituted products of this invention, R will preferably contain two or more ether or thioether linkages between arylene radicals and/or pendent aryl substituents on an aryl ether radical. Compounds of particular interest are those in which R corresponds to the following:

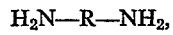

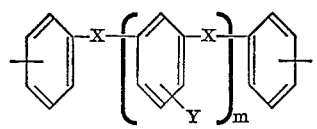

V wherein X is O or S, Y is H or C≡CH, $m$ is a value from 0 to about 4, and the amino groups of Formula IV are meta or para to the ether or thioether linkages.

A procedure such as that set forth in copending application Ser. No. 347,502, filed on Apr. 3, 1973, is useful in preparing diamino substituted compounds corresponding to V when Y is equal to C≡CH ortho to an ether linkage. A modification of that procedure as used in Y is equal to C≡CH meta to an ether linkage. In the second procedure the reaction may be exemplified by the following:

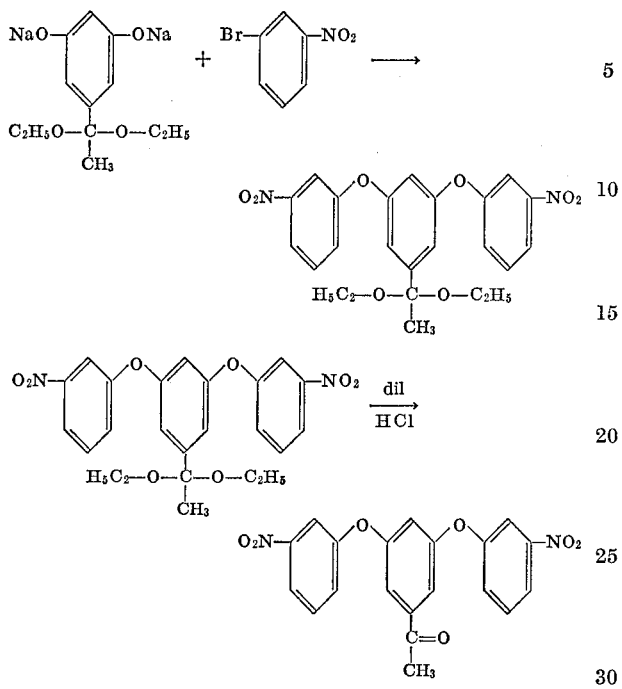

Once the acetyl product is obtained, subsequent conversion to the diamino acetylenic substituted compound is achieved through the corresponding steps of the procedure in Ser. No. 347,502.

In compounds where $m$ is 2 or more, the Y substituents may be the same or different. We prefer compounds wherein the amino groups are in the meta positions because they have lower meeting points and are more tractable and soluble than the corresponding para-substituted analogs. Representative compounds having pendant aryl groups are 3,3'-diamino-5-phenyl diphenyl ether, and 3,3'-diamino 5-phenoxy diphenyl ether. Other typical diamines include 1 - (3 - aminophenoxy) - 3 - (4-aminophenoxy)benzene, 1,3-bis(3-aminophenoxy)benzene, and 1-(4-aminophenoxy)-3-(4-aminophenoxy)benzene. We have had particularly good results with 1,3-di(3-aminophenoxy)benzene in producing acetylene-substituted polyamides which have good solubility and tractability.

Utilizing a dianhydride for illustration, the reaction proceeds according to the following equation:

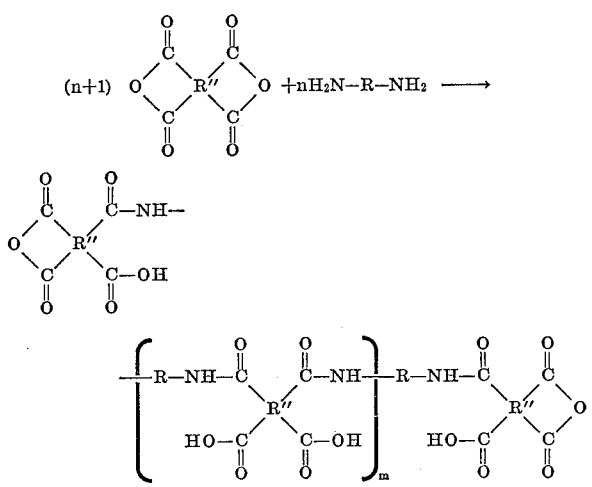

wherein $n$ is one or greater and $m$ is zero or greater. The number of repeating units depends upon the ratio of the tetracarboxylic acid or its derivative to the aryl diamine according to the following chart:

| $m$ | Molar ratio of carboxylic acid derivative to diamine |
|---|---|
| 0 | 2.00 |
| 1 | 1.50 |
| 2 | 1.33 |
| 3 | 1.25 |
| $m = \infty$ | 1.00 |

As illustrated above, the anhydride-capped polyamic acid or the corresponding acid- or ester-capped analog is reacted with a compound of the following formula:

$$H_2N\text{-Arylene-}C\equiv CH \qquad \text{VII}$$

wherein arylene is phenylene, naphthylene, or biphenylene. We prefer m-aminophenylacetylene, 3-amino-3'ethynylbiphenyl, 4-amino-3'-ethynylbiphenyl, or 3-amino-4'-ethynyldiphenyl ether and the 3,3' and 4,4' substituted analogs thereof because the meta substitutions provide oligomers with lower melting points, better solubility, and better melt flow properties. The intermediate and aminoarylacetylene may be reacted in a solvent such as dimethylformamide at elevated temperatures, e.g., from about 60° C. to about 100° C. The reaction produces a reasonable yield of the polyamic acid in from about 1 hour to about 4 hours. The dimethylformamide solvent may then be removed and the polyamic acid product diluted with the imidization agent such as acetic anhydride or a benzene-cresol mixture. When the latter is used, the reaction may be continued until water evolution ceases, and this can be seen by collecting the evolved water in an azeotropic trap. In this latter mixture the reaction temperature is regulated by the boiling point of the benzene-cresol mixture. After the reaction is completed, the solution is cooled and the solvent removed.

The aminoarylacetylenes (VII) are partly known compounds. For instance, J. P. Critchley, [Tetrahedron, 5; 340–351 (1959], describes a study in which he used p-aminophenylacetylene. The compounds of formula VII may be produced by a novel process which has been developed by our co-worker Robert H. Boschan.

In one embodiment of the Boschan process, an aromatic compound having both nitro and acetyl substituents is reacted, preferably under reflux, with dimethylformamide and phosphorus oxychloride to convert the acetyl radical to —C(Cl)=CHCHO. The reaction is exothermic and external cooling is needed to keep it at approximately room temperature. The β-chloro-substituted aldehyde radical is converted to —C≡CH by refluxing a solution of the compound in dioxane and sodium hydroxide. The product is extracted with an organic solvent such as ether, the organic solution is dried, the solvent is removed, and the product recovered by vacuum distillation. The nitro group is then converted to amino by refluxing an aqueous alcohol solution of the product with at least 6 moles of ferrous sulfate per mole of nitro compound. The product is removed by solvent extraction, e.g., ether, and purified, e.g., by vacuum distillation. The process is described in more detail in application Ser. No. 347,502, filed by the inventor concurrently with the parent application for which this application is a continuation-in-part. The two applications have a common assignee.

We have obtained excellent results with the acetylene-substituted polyimides of this invention. For example, they may be reacted with terephthalonitrile N,N'-dioxide to form copolymers which make excellent laminating resins and molding resins. Even more surprising, the acetylene-terminated polyimides may be used as such, even in the absence of a catalyst or curing agent, to prepare laminates of excellent physical properties.

The following examples are set forth to illustrate the present invention:

EXAMPLE I

A solution of 1,3-di(3-aminophenoxy)benzene (5.80 grams, 0.0198 mole) in 30 ml. of dry dimethylformamide was added dropwise to a rapidly stirring solution of benzophenotetracarboxylic dianhydride (17.78 grams, 0.0397 mole) in dry dimethylformamide (50 ml.). The solution was heated at gentle reflux for several hours. Then, 3-aminophenylacetylene (5.12 grams, 0.0438 mole) was added and the mixture was heated at 80° C. for 16 hours. The solvent was removed using the rotary evaporator, and 100 ml. acetic anhydride was added to the residue. The mixture was heated at reflux for several hours. After allowing the slurry to stand overnight, the mixture was dispersed in 350 ml. of absolute ethanol, filtered and washed with fresh ethanol. The resin was then vacuum dried to yield 14.1 grams of product.

EXAMPLE II

A solution of the acetylene-substituted polyimide was prepared by dissolving 20 grams of the resin of Example 1 in 200 ml. of sulfolane. Then 10 grams of terephthalonitrile N,N'-dioxide was added to the solution and the mixture was stirred at room temperature for 24 minutes. The resultant product was isolated by triturating the reaction mixture with about 5 times its volume of absolute ethanol, filtering, and washing the precipitated resin with fresh ethanol. The precipitated resin was reacted for 40 minutes at 230°-240° C. in a vacuum. Then it was dissolved in dimethylformamide and the lacquer was used to coat glass cloth reinforcement. A desirable resin content of the reinforcement is about 40 percent. A multi-layer laminate was made by molding at about 250° to 275° C. under vacuum bag conditions. The laminate was postcured at a temperature up to about 285° C.

EXAMPLE III

A lacquer of acetylene-substituted polyimide oligomer prepared in Example I was made with dimethylformamide. The lacquer had a solids content of 15 percent and was used to impregnate 181E glass cloth. The imprenated cloth was dried in a circulating air oven at 325° F. for a few minutes and then vacuum-dried at 275° F. for 16 hours. A seven-ply laminate was molded at 535° F., 200 p.s.i., 4 hours using a contact time of zero minutes. The resulting laminate had a resin content of 25.9 percent. It was then post-cured in air using the following cycle: 4 hours at each temperature, 450° F., 500° F., 555° F. and 600° F. An excellent molded laminate resulted which had a final void content of 1.3 percent. During the postcure the laminate lost only 0.31 percent in weight.

EXAMPLE IV

A solution of 1,3-di(3-aminophenoxy)benzene (5.80 grams, 0.0198 mole) in 30 ml. of dry dimethylformamide was added dropwise to a rapidly stirring solution of benzophenonetetracarboxylic dianhydride (17.78 grams, 0.0397 mole) in dry dimethylformamide (50 ml.). The solution was heated at gentle reflux for several hours. Then, 3-aminophenoxyphenylacetylene (9.16 grams, 0.0438 mole) was added and the mixture was heated at 80° C. for 16 hours. The solvent was removed using the rotary evaporator, and 100 ml. acetic anhydride was added to the residue. The mixture was heated at reflux for several hours. After allowing the slurry to stand overnight, the mixture was dispersed in 350 ml. of absolute ethanol, filtered and washed with fresh ethanol. The resin was then vacuum dried to yield 18 grams of product.

EXAMPLE V

A lacquer of acetylene-terminated polyimide oligomer similar to that prepared in Example IV in dimethylformamide, having a solids content of 15 percent, was used to impregnate 181E glass cloth having an A-1100 finish. The impregnated cloth was dried in a circulating air oven at 325° F. for a few minutes and then vacuum-dried at 275° F. for 16 hours. A seven-ply laminate was molded at 535° F., 200 p.s.i., 4 hours. The resulting laminate had a resin content of 26 percent. It was then post-cured in air using the following cycle: 4 hours at each temperature, 450° F., 500° F., 550° F., and 600° F An excellent molded laminate resulted which had a final void content of about 1 percent. During the post-cure the laminate lost less than one percent in weight.

EXAMPLE VI

Preparation of 1,3-di(3-nitrophenoxy)benzene

Sodium methoxide was prepared by adding absolute methanol (70 g., 2.2 moles) in dry benzene (250 ml.) to a rapidly stirred dispersion of sodium sand (46.0 g., 2.0 moles) in dry benzene (1000 ml.). The reaction mixture refluxed gently during the addition. Based on the absence of any gray color from unreacted sodium, the reaction was complete in about 2 hours. Then the freshly prepared sodium methoxide slurry in benzene was added to a dispersion of dry resorcinol (110 g., 1.00 mole) in dry benzene (1000 ml.) and the solution heated to reflux for several hours while stirring vigorously. The solvent was removed under argon, using an oil bath at 110° C. The final traces of solvent were removed by vacuum distillation. After the sodium resorcinate had cooled to room temperature, finely powdered cuprous chloride (34.6 g.) and a deaerated solution of 1-bromo-3-nitrobenzene (450 g., 2.20 moles) in pyridine (2000 ml.) were added and the mixture was heated by reflux under argon for 8 hours, cooled and filtered to remove inorganic salts. The filtrate was concentrated to about one-quarter of its volume on the rotary evaporator, diluted with benzene (1 liter) and washed in a separatory funnel successively with 1:1 hydrochloric acid, water, 10 percent aqueous sodium hydroxide, and water. The solvent was removed on the rotary evaporator. The resulting oily residue was then triturated with several portions of cold ethanol (0° C.), which effectively dissolved the unreacted 1-bromo-3-nitrobenzene. The product, 1,3-di-(3-nitrophenoxy)benzene, was recrystallized from ethanol. A yield of 146 g. (41.4 percent yield), m.p. 101-103° C., was obtained.

Preparation of 2,4-di(3-nitrophenoxy)acetophenone

This method involved the acetylation of 1,3-di(3-nitrophenoxy)benzene with acetyl chloride catalyzed by aluminum chloride. To a solution of 1,3-di(3-nitrophenoxy)benzene (176 g., 0.50 mole) in 1,2-dichloroethane (250 ml.) was added anhydrous aluminum chloride 147 g., 1.10 moles). Then acetyl chloride (43 g., 0.55 mole) was added dropwise over a 1.5-hour period while the temperature of the reaction mixture was kept at 0°-5° C. by external cooling. After the addition of the acetyl chloride was completed, an additional 3 g. of acetyl chloride was added to compensate for any loss from the hydrogen chloride evolution. The reaction mixture was allowed to come to room temperature and remain at room temperature for 1 hour. After this time the temperature was raised to 65° C. and held there for 45 minutes. The reaction mixture was added to about 1000 g. of crushed ice and the oily layer extracted with benzene. The benzene extract was evaporated on the rotary evaporator and the residue recrystallized from ethanol to yield 121 g. of product, m.p. 120°-121° C. This represents a 63.4 percent yield.

Preparation of 1-(2-formyl-1-chlorovinyl)-2,4-bis(3-nitrophenoxy)benzene

Phosphorus oxychloride (34.8 g., 0.23 mole) was added to dimethyl-formamide (60 ml.) with constant stirring. The reaction mixture was maintained at room temperature. It was stirred for an additional 1.5 hours.

Then a solution of 2,4-di(3-nitrophenoxy)acetophenone (60.0 g., 0.15 mole) in warm dimethylformamide (100 ml.) was added dropwise. The reaction temperature was maintained at 40°–42° C. during the addition to prevent precipitation. The solution was kept at room temperature for several days. It was then added to an ice-cold saturated aqueous solution of sodium bicarbonate and the solution extracted with benzene. The benzene extract was then washed with water, dried with anhydrous potassium carbonate and evaporated on the rotary evaporator. A portion of the residue was recrystallized from isopropyl alcohol. The yellow crystals had a wide melting range starting at about 100° C. This is probably due to the presence of several isomers.

Preparation of 2-4-di(3-nitrophenoxy)phenylacetylene

To a refluxing solution of sodium hydroxide (4.0 g., 0.10 mole) in water (50 ml.) was added a solution of 1-(2-formyl-1-chlorovinyl) - 2,4 - bis - (3-nitrophenoxy) benzene made above in dioxane (50 ml.) at such a rate that refluxing did not stop. The addition required 45 minutes. The solution was heated at reflux for an additional 30 minutes. After cooling the solution it was extracted with ether. The ether extract was evaporated on the rotary evaporator to yield 12.4 grams of product. This product was then recrystallized from ethanol to yield an amber product that had a very wide melting point range. It started to melt at 72° C. and was completely molten at 107° C.

Preparation of 2,4-di(3-aminophenoxy)phenylacetylene

To a refluxing solution of ferrous sulfate heptahydrate (59.2 g., 0.213 mole) in water (125 ml.) was added, over a period of 45 minutes, a solution of 2,4-di(3-nitrophenoxy)phenylacetylene (10.0 g., 0.027 mole) in 175 ml. of dioxane. Refluxing was continued for an additional 2½ hours after which concentrated ammonium hydroxide (40 ml.) was added. Refluxing was continued under argon for 16 hours, and the mixture was cooled and extracted with ether. The ether extract was dried with Drierite and evaporated to dryness. The light brown solid was weighed and the yield indicated that the reduction had taken place almost quintitatively. After purification by chromatography the compound was used to prepare polyimide oligomers.

What is claimed is:

1. A compound having the following chemical structure:

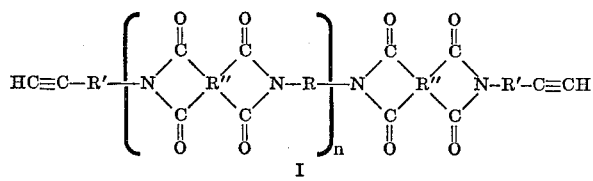

I wherein R is poly(arylene ether) or poly(arylene thioether), R' is arylene or diarylene ether, n is an average from 1 to about 10, and R'' is

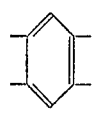

II or

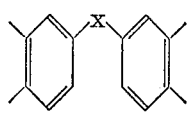

III and X is C=O, CH$_2$, O, S, or a bond.

2. The compound of claim 1 wherein n is an average of 1 to about 4.
3. A compound of claim 1 wherein R' is phenylene.
4. A compound of claim 3 wherein each acetylene group is in meta position with respect to an amide group.
5. A compound of claim 4 wherein R is

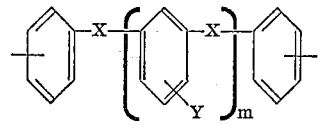

V wherein X is O or S, Y is H or C≡CH, each imide group is attached in meta or para position with respect to an ether or thioether linkage and m is 0 to about 4.

6. A compound of claim 5 wherein at least one Y is C≡H.
7. A compound of claim 5 wherein R'' is

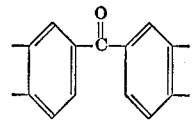

8. A compound of claim 2 wherein R' is

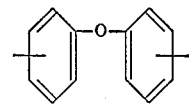

and each imide group is attached in meta or para position with respect to an ether linkage.

9. A compound of claim 8 wherein each acetylene group is in meta position with respect to the ether linkage.
10. A compound of claim 9 wherein R is

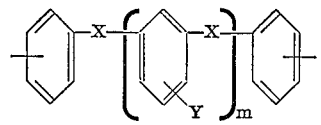

wherein X is O or S, Y is H or C≡H, each imide group is attached in meta or para position with respect to an ether or thioether linkage, and m is 0 to about 4.

11. A compound of claim 10 wherein at least one Y is C≡H.
12. A compound of claim 1 wherein R is a mixture of R groups.
13. A compound of claim 1 wherein R' is a mixture of R' groups.
14. A compound of claim 1 wherein R'' is a mixture of R'' groups.
15. A compound of the following structure

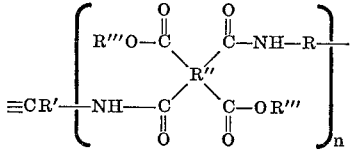

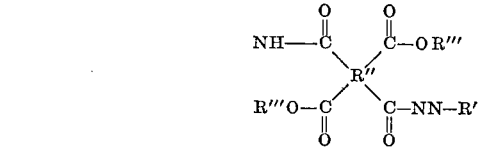

wherein R is diarylene ether or diarylene thioether, R' is arylene or diarylene ether, n is an average from 1 to about 4, R'' is

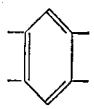

II or

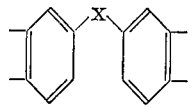

III

X is C=O, CH$_2$, O, S, or a bond and R''' is H or a lower alkyl.

16. A compound of claim 15 wherein $n$ is an average of about 1.

17. A compound of claim 15 wherein R' is phenylene.

18. A compound of claim 16 wherein each acetylenic group is in meta position with respect to the nitrogen atom.

19. A compound of claim 17 wherein R is

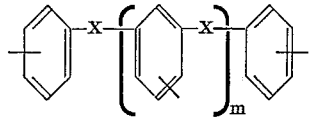

wherein X is O or S, Y is H or C≡H, $m$ is 0 to about 4, and each nitrogen atom is attached in meta or para position with respect to an ether linkage.

20. A compound of claim 15 wherein R is a mixture of R groups.

21. A compound of claim 16 wherein R' is a mixture of R' groups.

22. A compound of claim 15 wherein R'' is a mixture of R'' groups.

23. A compound of claim 15 wherein R''' is a mixture of R''' groups.

References Cited

UNITED STATES PATENTS

| | | | |
|---|---|---|---|
| 3,516,967 | 6/1970 | Funer | 260—47 |
| 3,526,610 | 9/1970 | Bower | 260—75 |

LESTER L. LEE, Primary Examiner

U.S. Cl. X.R.

161—197, 227; 260—32.6 N, 47 CZ, 49, 63 N, 65, 78 TF, 78 UA, 326 N

PO-1050
(5/69)

UNITED STATES PATENT OFFICE
CERTIFICATE OF CORRECTION

Patent No. 3,845,018      Dated October 29, 1974

Inventor(s) NORMAN BILOW ET AL

It is certified that error appears in the above-identified patent and that said Letters Patent are hereby corrected as shown below:

In the Title, "POLYAMIDE" should read --POLYIMIDE--.
Column 1, line 37, "disclose" should read --disclosed--.
Column 2, the structures shown in lines 20-34 should be
    connected so that 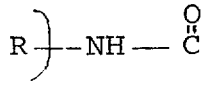
Column 2, line 47, "(arylene ether," should read --(arylene ether),--.
Column 2, line 71, "as used in Y is" should read --is used when Y is--.
Column 3, the structure shown in lines 52-73 should be identified by "VI".
Column 5, line 44, "imprenated" should read --impregnated--.
Column 5, line 51, "555OF" should read --550°F--.
Column 6, line 50, a hyphen should be inserted after "1,3-di(3-nitrophenoxy)".
Column 7, line 19, a hyphen should be inserted after "(3-nitrophenoxy)".
Column 7, line 43, "quintitatively" should read --quantitatively--.
Column 7, line 72, "and X is C=O, CH$_2$, O. S, or a bond." should read --and X is C=O, CH$_2$, O, S, or a bond--.
Column 8, line 2, "amide" should read --imide--.
Column 8, in the structure shown in lines 49-61, the following:
    "≡CR'" should read --HC≡CR'--, "\C-NN-R'" should read --\C-NH-R'--,
      ‖                      ‖
      O                      O
    and the structures should be connected so that
    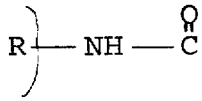

Column 9, in the structural formula shown in lines 10-15, the floating bond should have a "Y" attached.
Column 10, line 3, "Claim 16" should read --Claim 15--.

Signed and Sealed this thirtieth Day of March 1976

[SEAL]

Attest:

RUTH C. MASON
Attesting Officer

C. MARSHALL DANN
Commissioner of Patents and Trademarks